United States Patent [19]

Izume et al.

[11] Patent Number: 4,499,363

[45] Date of Patent: Feb. 12, 1985

[54] DC POWER SOURCE

[75] Inventors: Takatomo Izume, Urawa; Chihiro Okado, Fuchu, both of Japan

[73] Assignee: Tokyo Shibaura Denki Kabushiki Kaisha, Kawasaki, Japan

[21] Appl. No.: 397,779

[22] Filed: Jul. 13, 1982

[30] Foreign Application Priority Data

Jul. 30, 1981 [JP] Japan .................................. 56-119748
Nov. 18, 1981 [JP] Japan .................................. 56-184685

[51] Int. Cl.$^3$ .............................................. B23K 11/24
[52] U.S. Cl. ................................ 219/130.21; 219/110; 219/130.32; 323/300
[58] Field of Search ...................... 219/130.21, 130.31, 219/130.32, 130.33, 110, 114; 363/85, 128; 323/299, 300

[56] References Cited

U.S. PATENT DOCUMENTS 3,875,367  4/1975  Tanaka ................................. 219/110
4,076,974  2/1978  Gee ..................................... 219/114
4,254,466  3/1981  Jurek ................................... 219/110

Primary Examiner—Clifford C. Shaw
Attorney, Agent, or Firm—Oblon, Fisher, Spivak, McClelland & Maier

[57] ABSTRACT

A DC power source apparatus is provided including a current regulator having an electronic contactor, a transformer having a primary winding and a secondary winding. A series circuit of the primary winding and the current regulator is adapted for connection to an AC power source. The AC power source apparatus also includes a rectifier connected to the secondary winding of the transformer, output terminals of the rectifier being adapted to supply DC current to a DC load having an inductance. The AC power source apparatus further includes a simulator connected to detect an AC current flowing through the series circuit for simulating the DC current flowing through the DC load based on the detected AC current and a simulated time constant of the DC load to produce a simulated signal, and a controller connected to receive the simulated signal for comparing the simulated signal with a predetermined current reference to produce a phase control signal based on a comparison result. The current regulator is further connected to receive the phase control signal for controlling the electronic contactor such that the DC current becomes equal to a predetermined value corresponding to the predetermined current reference. A control apparatus for a DC power source apparatus is also provided.

18 Claims, 9 Drawing Figures

DC POWER SOURCE

BACKGROUND OF THE INVENTION

1. Field of the Invention

This invention relates generally to a DC power source apparatus and a control apparatus thereof and more particularly to a DC power source apparatus and a control apparatus thereof to supply a DC load a controlled DC power obtained from an AC power source through a current regulator including electronic contactors and a rectifier circuit.

2. Description of the Prior Art

As an example of DC power source apparatus, FIG. 1 shows a circuitry for a conventional DC-type welder 40. In FIG. 1, from an AC power source 1, conduction-phase-controlled AC current Iac is supplied through a current regulator 2 including electronic contactors such as antiparallel-connected thyristors 2a and 2b to a primary winding of a transformer 3. To a secondary winding of the transformer 3, a rectifier circuit 4 including bridge-connected diodes 4a, 4b, 4c and 4d is connected, and a DC current Idc which is a rectified output of the transformer 3 is supplied to a DC load such as welder electrodes 5.

DC current which flows through the welder electrode 5 is detected by a current detector 6, and this detected signal is amplified and averaged by an amplifier 7. The output of the amplifier 7 is compared with a predetermined current reference $I_R$ at an adder 7-1, and the compared result difference is supplied through an amplifier 8 to a phase controller 9. The phase controller 9 controls conduction phase of the thyristors 2a and 2b of the current regulator 2 by firing pulse Vg so that such difference becomes zero, namely the DC current Idc which flows through the electrodes 5 becomes equal to the current reference $I_R$.

The above-described conventional DC power source apparatus has disadvantages:

(1) Since a welding DC current is generally large as in the range of from approximately 5 to 30 KA, the current detector thereof has difficulties to be inserted in place, or becomes larger in dimension, thus economical drawbacks have been experienced.

(2) The distance between the installation site of the control apparatus which incorporates a current control circuit and electronic contactors and that of the welder main unit which incorporates a transformer and a rectifier circuit has frequently become as far as several dekameters. (This derives from such a necessity that the secondary winding of transformer through which such a current of several deca-KA flows should be minimal in wiring length.) Therefore, the conventional apparatus which detects current at the DC side has inevitably had a lengthy wiring distance between the welder main unit and the control apparatus thereof, and this causes troubles such as noise disturbances, and also increases in cost of the installation.

SUMMARY OF THE INVENTION

Accordingly, one object of this invention is to provide a new and improved DC power source apparatus and a control apparatus thereof capable of performing a highly accurate and reliable control.

Another object of this invention is to provide a DC power source apparatus and a control apparatus thereof capable of achieving a simplified and economical installation.

These and other objects of this invention can be achieved by providing a DC power source apparatus including a current regulator having an electronic contactor, a transformer having a primary winding and a secondary winding. A series circuit of the primary winding and the current regulator is adapted for connection to an AC power source. The AC power source apparatus also includes a rectifier connected to the secondary winding of the transformer. Output terminals of the rectifier are adapted to supply DC current to a DC load having an inductance. The AC power source apparatus further includes a simulator connected to detect an AC current flowing through the series circuit for simulating the DC current flowing through the DC load based on the detected AC current and a simulated time constant of the DC load to produce a simulated signal, and a controller connected to receive the simulated signal for comparing the simulated signal with a predetermined current reference to produce a phase control signal based on a comparison result. The current regulator is further connected to receive the phase control signal for controlling the electronic contactor such that the DC current becomes equal to a predetermined value corresponding to the predetermined current reference.

These and other objects of this invention can further be achieved by providing a control apparatus for a DC power source apparatus including a current regulator having an electronic contactor, a transformer having a primary winding and a secondary winding, a series circuit of the primary winding and the current regulator being adapted for connection to an AC power source, and a rectifier connected to the secondary winding of the transformer, output terminals of the rectifier being adapted to supply DC current to a DC load having an inductance. The control apparatus includes a simulator connected to detect an AC current flowing through the series circuit for simulating the DC current flowing through the DC load based on the detected AC current and a simulated time constant of the DC load to produce a simulated signal, and a controller connected to receive the simulated signal for comparing the simulated signal with a predetermined current reference to produce a phase control signal based on a comparison result. The current regulator is further connected to receive the phase control signal for controlling the electronic contactor such that the DC current becomes equal to a predetermined value corresponding to the predetermined current reference.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings wherein.

DESCRIPTION OF THE PREFERRED EMBODIMENTS

Figure 1:
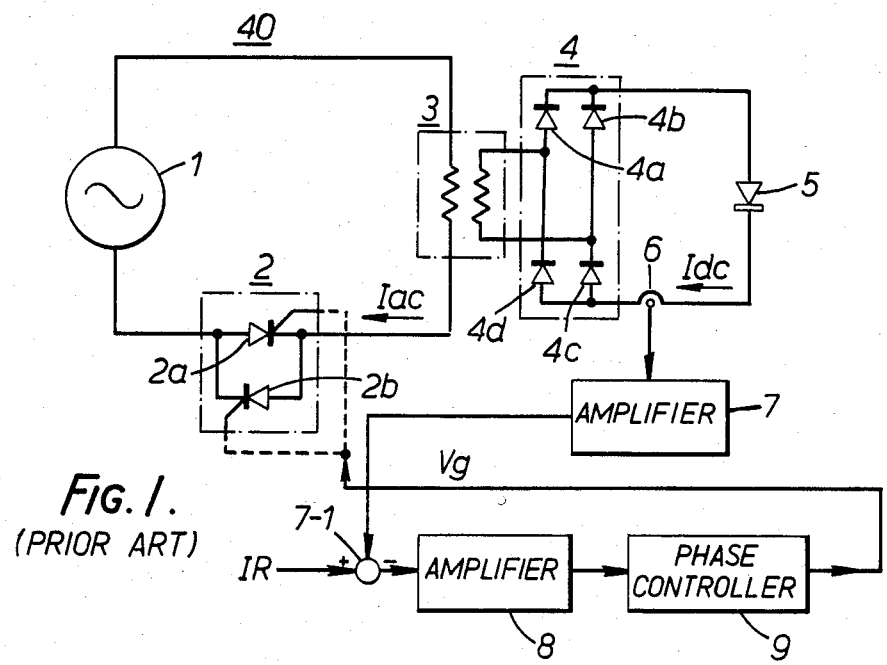
FIG. 1 is a schematic diagram illustrating a circuitry of a conventional DC-type welder.
Figure 2:
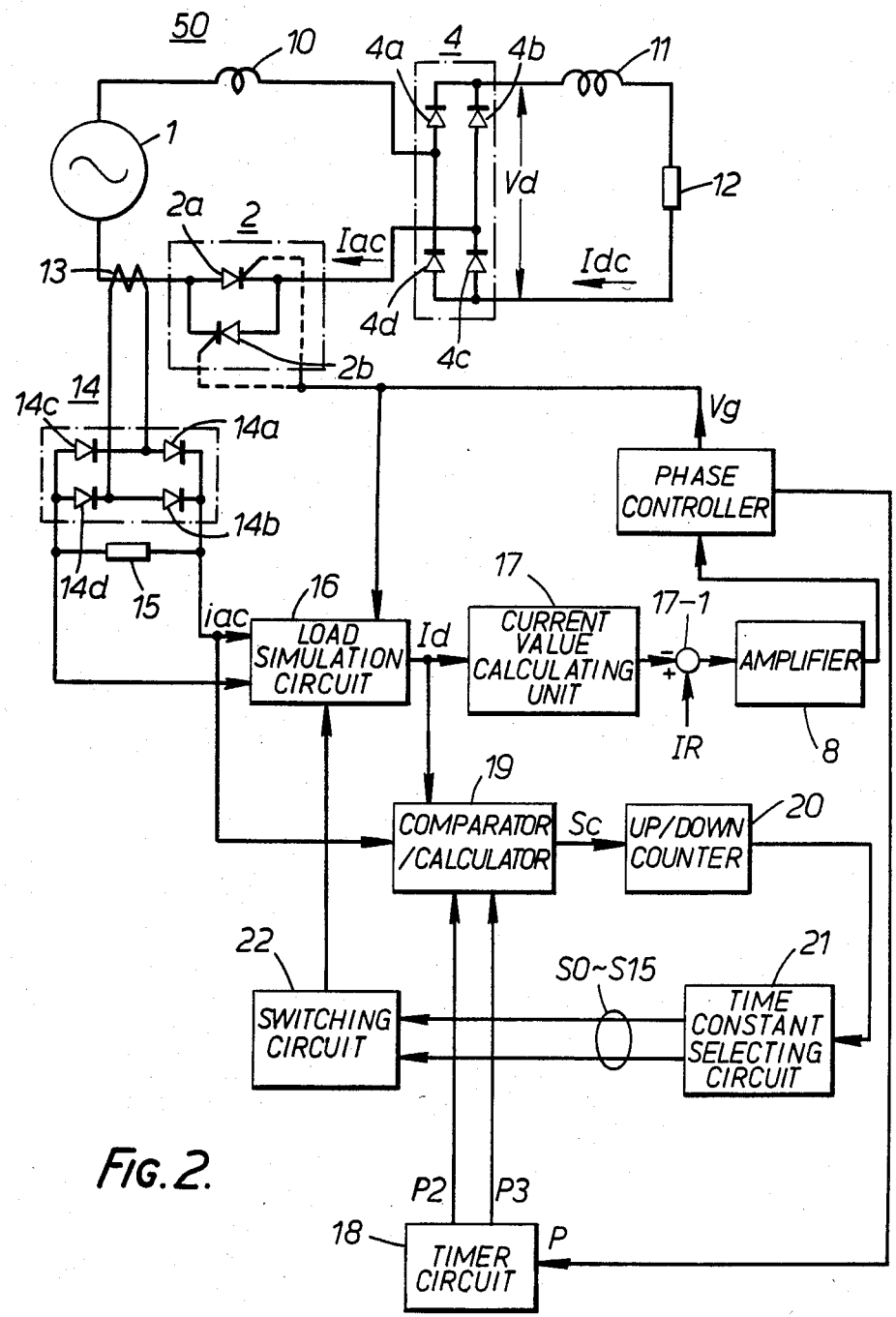
FIG. 2 is a schematic diagram illustrating a circuitry of a DC-type welder of an embodiment according to the present invention.

Referring now to the drawings, wherein like reference numerals designate identical or corresponding parts throughout the several views, and more particularly to FIG. 2, one embodiment of the present invention will be described. In FIG. 2, which shows a circuitry of a DC-type welder 50 of an embodiment according to the present invention, the main circuit portion that supplys power from the AC power source 1 to the DC load 5 is substantially identical in function to that shown in FIG. 1, however, for ease of explanation, it is illustrated partially in an equivalent circuit. Namely, illustration of the transformer 3 is herein omitted, so that an AC side inductance 10 which includes that much of the transformer 3 is inserted into AC side circuit. The DC side circuit is also represented by a DC side inductance 11 and a DC side load resistance 12, both including those of a DC load 5. Here, a DC side time constant T is expressed by an equation of $T=L/R$, where L represents the value of the inductance 11 and R, the value of the load resistance 12. In the main circuit portion of the DC-type welder 50, the same as in the case of the DC-type welder 40 shown in FIG. 1, the conduction-phase-controlled AC current Iac flows to the AC side from the AC power source 1 through the current regulator 2. In the DC side, such AC current Iac is converted by means of the transformer 3 and the rectifier circuit 4 into the DC current Idc of a magnitude of several deca-KA, which in turn, is supplied to the electrodes 5 so as to weld plates such as iron plates sandwiched therebetween.

Nextly, a control apparatus of the DC-type welder 50 will be described. The AC current Iac is detected by means of a current detector 13 such as a current transformer disposed in the AC side, and rectified by a rectifier 14 consisting of bridge-connected diodes 14a, 14b, 14c and 14d. This rectified current flows into a resistor 15 connected as a load of the rectifier 14 and a DC voltage signal iac proportional to the DC current produced by rectifying the AC current Iac is developed across the resistor 15. The voltage signal iac is converted by means of a load simulation circuit 16 into the signal Id which simulates the DC current Idc of the welder 50, and is outputted. The simulated signal Id is then converted by means of a current value calculating circuit 17 into an effective value (or a mean value) of the current, and is outputted. The output of the current value calculating circuit 17 is compared with a predetermined current reference $I_R$ at an adder 17-1, and this difference is supplied through an amplifier 8 to a phase controller 9A. The phase controller 9A controls by firing pulse Vg, conduction phase of the current regulator 2 so that such difference becomes zero, namely, the DC current Idc which flows through the electrodes 5 becomes equal to the current reference $I_R$. Strictly speaking, the DC current Idc is controlled such that it becomes equal to a predetermined value corresponding to the current reference $I_R$, but for the purpose of the simplicity, it is simply written hereinafter that the DC current Idc becomes equal to the current reference $I_R$.

Figure 3:
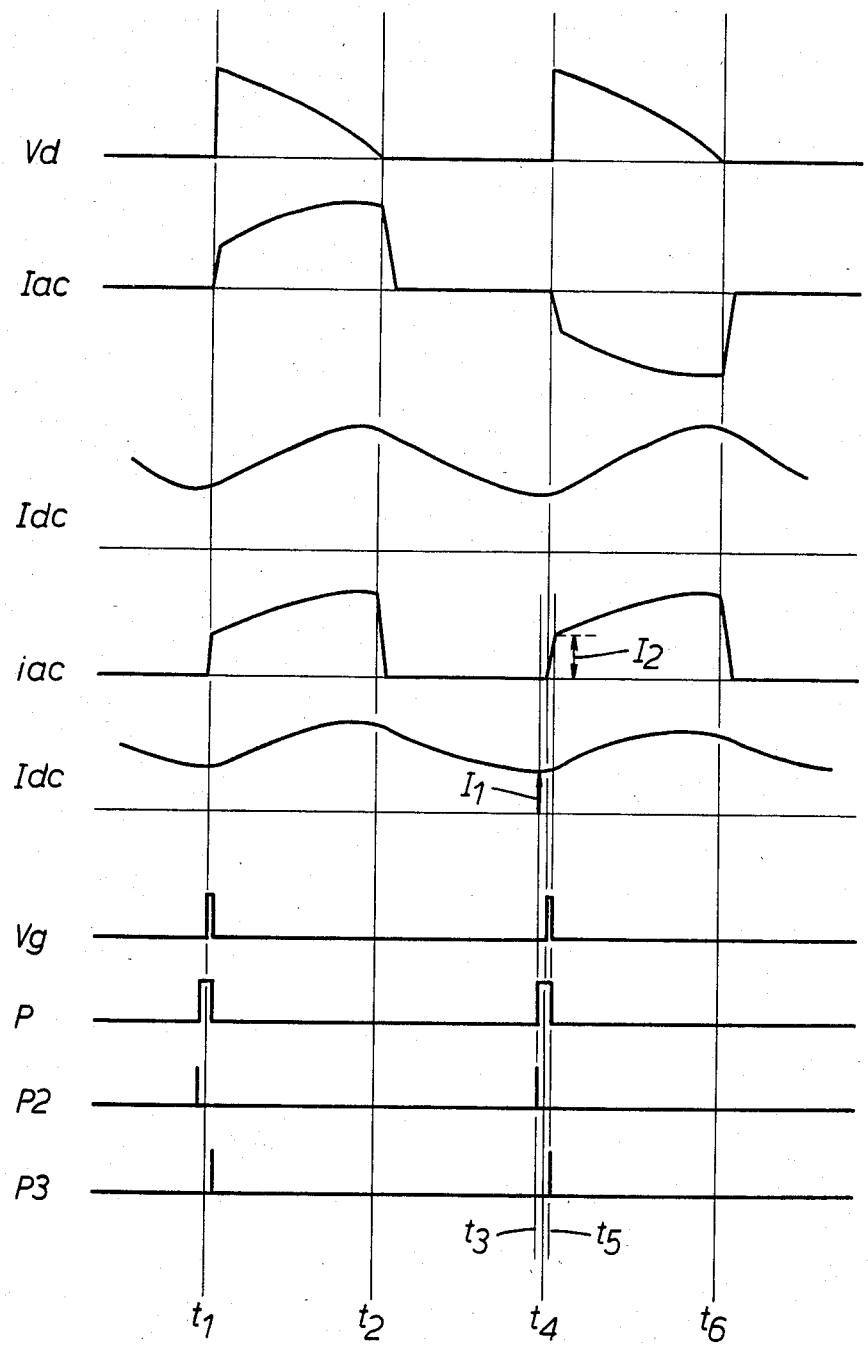
FIG. 3 is a diagram illustrating waveforms of principal portions of the DC-type welder shown in FIG. 2.

Next, the detailed operation of the main circuit portion of the welder 50 will be described. FIG. 3 shows waveforms of principal portion of the DC-type welder 50. In FIG. 3, Vd represents a DC voltage of the DC side, and the DC voltage Vd rises at a time $t_1$ when the thyristor 2a or 2b is fired by the firing pulse Vg produced from the phase conroller 9A. At a time $t_2$, the voltage of the AC power source 1 becomes zero, and the DC voltage Vd also becomes zero. In the following half cycle of the AC power source the firing pulse Vg is produced at a time $t_4$ so as to cause the DC current Idc to be equal to the current reference $I_R$, whereby the DC voltage Vd rises at the time $t_4$, and becomes zero at a time $t_6$ as in the same manner described above. The DC voltage Vd repeats the identical waveforms in the following cycles thereafter.

Next, at the time $t_1$, the AC current Iac commences to flow. Since the value of the AC side inductance 10 of the welder 50 is extremely smaller than that of the DC side inductance 11, the current rapidly commutates to the AC side from the rectifier circuit 4 wherein the circulation current has been flowing. Therefore, the AC current Iac rises at the time $t_1$, and at the time $t_2$ when the DC voltage Vd becomes zero, the AC current Iac decreases rapidly. In the following half cycle, the AC current Iac flows in the direction opposite to that in the case of the period between the times $t_1$ and $t_2$. The AC current Iac repeats the identical waveforms in the following cycles thereafter. The DC current Idc, during the period between the times $t_1$ and $t_2$, varies maintaining the relationship proportional to the AC current Iac. At the time $t_2$, although the AC current Iac decreases rapidly, the DC current Idc, due to the inductance 11 of the DC side, circulates through the rectifier circuit 4 independently of the AC side, and it attenuates in accordance with the time constant $T=L/R$ during the period between the times $t_2$ and $t_4$. Also in the following half cycle, the DC current Idc becomes the identical waveform, and repeats the identical waveforms thereafter.

Nextly, the voltage signal iac is, as shown in the diagram, the signal having waveforms proportional to the DC current produced by rectifying the AC current Iac. The load simulation circuit 16 receives the voltage signal iac, and produces a signal Id which simulates the DC current Idc. The simulated signal Id shows the waveform identical to the voltage signal iac during the period the thyristor 2a or 2b is in the ON state, that is the period between the times $t_1$ and $t_2$. During the period both the thyristors 2a and 2b are in the OFF state (the period between the times $t_2$ and $t_4$), the signal Id has the waveform such that the voltage signal iac at the time $t_2$ (immediately before the thyristor 2a or 2b is turned off) attenuates in accordance with a time constant Ts which simulates the time constant T. When the thyristor 2a or 2b is turned on at the time $t_4$, the signal Id shows the waveform identical to that of the voltage signal iac, and repeats the same thereafter. The specific circuitry of the load simulation circuit 16 will be later described in detail.

Next, a circuit which causes the time constant Ts of the load simulation circuit 16 to coincide with the time constant T of the DC side will be hereinafter described. The phase controller 9A produces the firing pulse Vg so as to supply the current regulator 2, which is the same as the phase controller 9 described above. The phase controller 9A further produces a pulse P that rises at the time $t_3$ which slightly leads the time $t_4$ at which the firing pulse Vg rises, and falls at a time $t_5$ which slightly lags behind the time $t_4$. A timer circuit 18 receives the pulse P, and produces a pulse $P_2$ at the time $t_3$ at which the pulse P rises, and produces a pulse $P_3$ at the time $t_5$ at which the pulse P falls. Reference numeral 19 designates a comparator/calculator which is connected to receive the pulses $P_2$ and $P_3$ from the timer circuit 18, and also to receive the voltage signal iac developed across the resistor 15 and the signal Id, the output of the load simulation circuit 16. On the basis of the pulses $P_2$ and $P_3$, the comparator/calculator 19 detects the value $I_1$ of the signal Id at the time $t_3$, namely at the instant immediately before the thyrister 2a or 2b is turned on, and detects the value $I_2$ of the voltage signal iac at the time $t_5$ namely when the thyristor 2a or 2b has been turned on, and in turn, the AC current Iac has risen. Further, the comparator/calculator 19 compares the signal value $I_1$ with the signal value $I_2$, and on the basis of the compared result, produces a comparison signal Sc. 20 designates, for example, an up/down counter consisting of 4 bits, and it counts up or counts down in accordance with the comparison signal Sc. Namely, the up/down counter 20 is so arranged as to count down when the signal value $I_1$ is greater than the signal value $I_2$, and to count up when the signal value $I_1$ is smaller than the signal value $I_2$. A time constant selecting circuit 21 is connected to the output of the up/down counter 20, and is so arranged as to decode the 4-bit-output signals of the up/down counter 20 into 16-bit signals, and to output as selecting signals $S_0$ to $S_{15}$. A switching circuit 22 is so arranged as to receive the selecting signals $S_0$ to $S_{15}$ from the time constant selecting circuit 21, and to switch the time constant Ts of the load simulation circuit 16.

Figure 4:
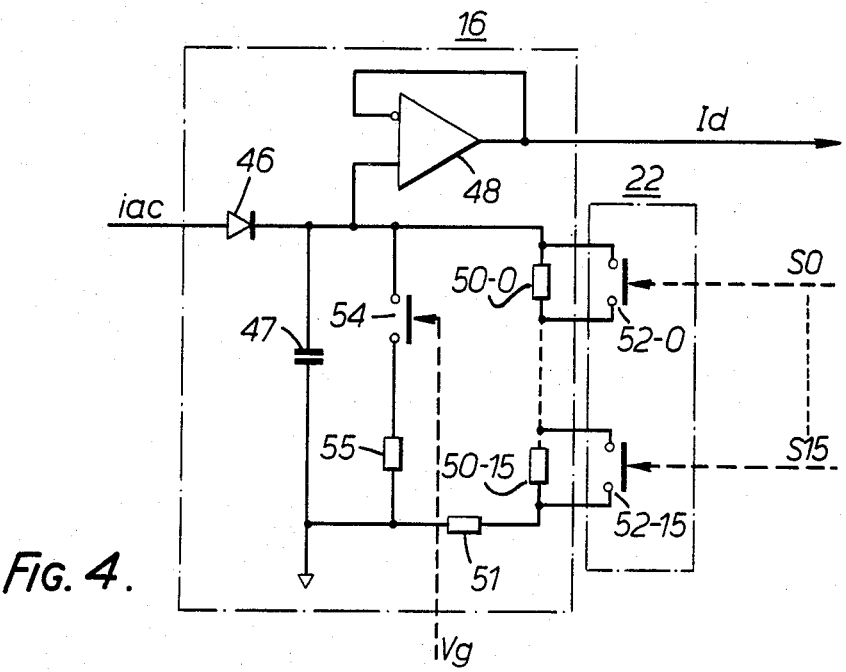
FIG. 4 is a diagram illustrating one example of circuitry of a load simulation circuit and a switching circuit.

Next, the detail of the load simulation circuit 16 and the switching circuit 22 will be described with reference to FIG. 4. In FIG. 4, a diode 46 is required as of ideal characteristics (with no forward voltage drop), and can be realized by a circuit employing an operational amplifier. The diode 46 receives the voltage signal iac developed across the resistor 15. A capacitor 47 is a component for use in simulating the inductance 11 of the main circuit. Resistors 50-0 through 50-15 and a resistor 51 constitute a discharging circuit of the capacitor 47 so as to determine the time constant Ts of the load simulation circuit 16. Switches 52-0 through 52-15 disposed in parallel with the respective resistors 50-0 through 50-15 constitute the switching circuit 22, and the respective switches 52-0 through 52-15 are operated in an on-off control manner depending on the selecting signals $S_0$ through $S_{15}$ from the time constant selecting circuit 21. An operational amplifier 48 is employed as a buffer amplifier, and the gain thereof is of unity. The output of the operational amplifier 48 is produced as the output signal Id of the load simulation circuit 16. The switch 54 and the resistor 55 constitute a circuit to reset, that is to discharge, the capacitor 47 at the time $t_4$, and the switch 54 is operated in an on-off control manner depending on the firing pulse Vg from the phase controller 9A.

Figure 5:
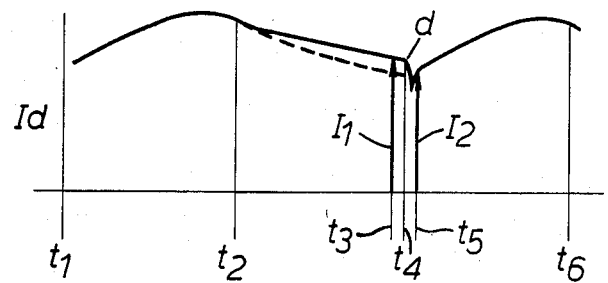
FIGS. 5 and 6 are diagrams illustrating in detail the waveforms of signal Id.

The operation of the load simulation circuit 16 will be hereinafter described with reference to FIG. 5. FIG. 5 shows the waveform of the enlarged waveform of the signal Id in FIG. 3. In FIG. 5, the dotted line shows the waveform of the signal Id in the case when the time constant Ts of the load simulation circuit 16 coincides with the time constant of the DC side. Here, the operation will be described in the case when the time constant Ts is greater than the time constant T, and the signal Id is shown in solid line. In this case, at the time $t_4$, the signal Id lies on the dot d, and is greater than the value $I_2$ of the voltage signal iac at the time $t_5$. At the time $t_4$, the load simulation circuit 16, on the basis of the firing pulse Vg from the phase controller 9A, causes the switch 54 to be turned on an in turn, causes the capacitor 47 to be discharged through the resistor 55. As a result, at the time $t_5$, the capacitor 47 is charged by the voltage signal iac through the diode 46, and the signal Id becomes equal to the voltage signal iac. The signal Id shows the waveform identical to that of the voltage signal iac until the time $t_6$ when the voltage signal iac decreases rapidly after both the thyristors 2a and 2b are turned off.

Figure 6:
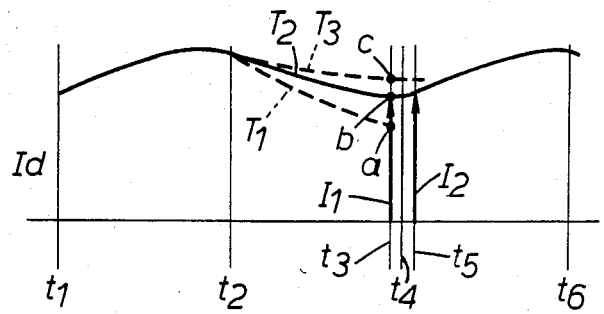

Next, the operation of a circuit which causes the time constant Ts of the load simulation circuit 16 to coincide with the time constant T of the DC side will be described. FIG. 6 shows the enlarged waveform of the signal Id in FIG. 3. In the case when the time constant T of the DC side of the main circuit coincides with the time constant Ts of the load simulation circuit 16, that is, when the time constant Ts is equal to the time constant $T_2$ shown in FIG. 6, the value $I_1$ of the signal Id at the time $t_3$ becomes to lie on the dot b, and becomes equal to the value $I_2$ of the voltage signal iac at the time $t_5$. In the case when the time constant Ts is smaller than the time constant T, that is when the time constant Ts equals $T_1$, the signal value $I_1$ becomes to lie on the dot a, namely the signal value $I_1$ becomes smaller than the signal value $I_2$ ($I_1 < I_2$). In this case, as described above, the comparator/calculator 19 compares the signal value $I_1$ with the signal value $I_2$, and confirms that the signal value $I_1$ is smaller than the signal value $I_2$, consequently produces the comparison signal Sc so as to cause the up/down counter 20 to count up. The time constant selecting circuit 21, on the basis of the output of the up/down counter 20 which has counted up, outputs the selecting signals $S_0$ through $S_{15}$. On the basis of the selecting signals $S_0$ through $S_{15}$, the switching circuit 22 operates the on-off control over the switches 52-0 through 52-15 so that the actual resistance value of the circuit consisting of the series-connected resistors 50-0 through 50-15 is increased. This causes the time constant Ts of the load simulation circuit 16 to increase. Further, in the following half cycle and thereafter, until the time constant Ts becomes equal to the time constant T, such similar operations are repeatedly made. On the contrary, when the time constant Ts is greater than the time constant T, that is, when the time constant Ts equals $T_3$, the signal value $I_1$ becomes to lie on the dot c, and the signal value $I_1$ becomes greater than the signal value $I_2$ ($I_1 > I_2$). In this case, in contrast to the above-described case of $I_1 < I_2$, the up/down counter 20 counts down. As a result, the switching circuit 22 operates the on-off control over the switches 52-0 through 52-15 so as to decrease the actual resistance value of the circuit consisting of the series-connected resistors 50-0 through 50-15. This causes the time constant Ts to decrease, and further, in the following half cycle and thereafter, such similar operations are repeatedly made until the time constant Ts becomes equal to the time constant T.

As described above, there is provided such a minor loop as to cause the time constant Ts of the load simulation circuit 16 to invariably coincide with the time constant T of the DC side of the welder 50, and this can simulate the DC current $I_{dc}$ without measurement of the DC current $I_{dc}$ but only with simple detection of the AC current $I_{ac}$.

Figure 7:
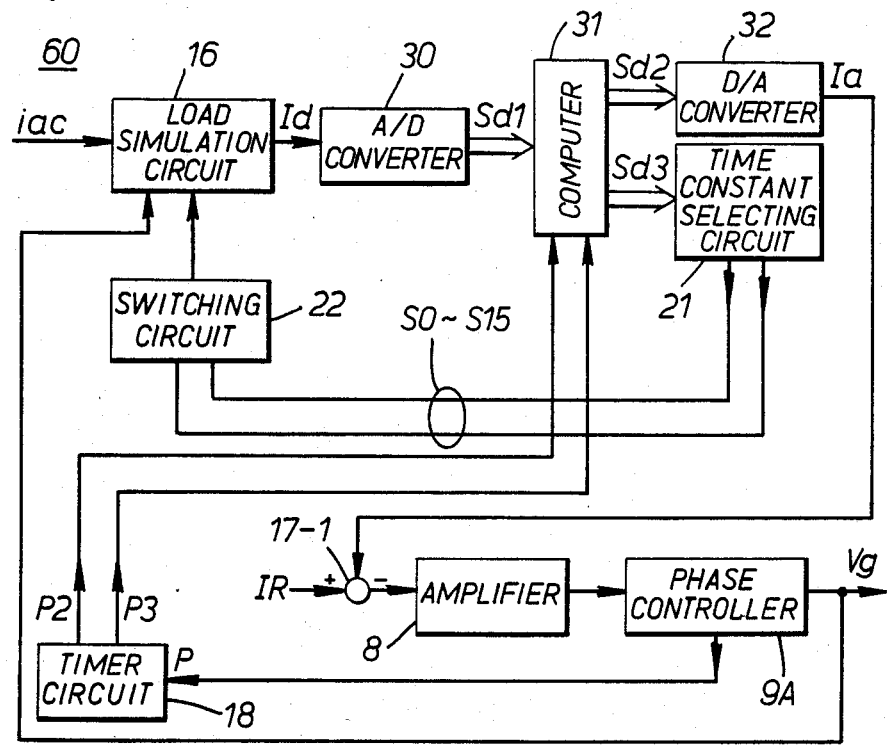
FIG. 7 is a diagram illustrating a circuitry of a part of a DC-type welder of another embodiment according to the present invention.

Nextly, another embodiment of the present invention will be described with reference to FIG. 7. FIG. 7 shows another embodiment of the present invention, and illustrates a part of the DC-type welder 60 realized by utilizing a computer as a part of control apparatus. In FIG. 7, reference numeral 30 designates and A/D converter, which converts the analog signal Id of the load simulation circuit 16 which simulates the DC current $I_{dc}$ into a digital signal and outputs it as a first digital signal $S_{d1}$. A computer 31 has such a function as combined functions of the current value calculating circuit 17, the comparator/calculator 19 and the up/down counter 20 of the control apparatus of the welder 50 shown in FIG. 2. The computer 31 receives the first digital signal $S_{d1}$, and converts this signal into an effective value (or mean value) of the DC current $I_{dc}$, which is outputted as a second digital signal Sd2. A D/A converter 32 converts the second digital signal Sd2 into an analog signal and outputs it as a signal Ia. The signal Ia corresponds to the output of the current value calculating circuit 17 shown in FIG. 2, and the signal Ia is supplied to an adder 17-1 so as to be compared with a predetermined current reference $I_R$. The operations thereafter are made in the same manner as in the case of the welder 50 shown in FIG. 2, namely, the DC current $I_{dc}$ is controlled such that it becomes equal to the current reference $I_R$. On the other hand the pulses $P_2$ and $P_3$ from the timer circuit 18 are supplied to the computer 31 as interruption inputs. As the computer 31, as described above, has received the first digital signal $S_{d1}$, it reads the digital signal $S_{d1}$ at the time $t_3$ at which the interruption of the pulse $P_2$ occurs, as a digital signal value $I_1$. Further, the computer 31 reads the digital signal $S_{d1}$ at the time $t_5$ at which the interruption of the pulse $P_3$ occurs as a digital signal value $I_2$. The signal value $I_2$ represents the value of the voltage signal iac at the time $t_5$, and as described above, at the time $t_5$ the value of the voltage signal iac which is the input of the load simulation circuit 16 is equal to the value of the signal Id which is the output thereof, so that the signal Id can be used in place of the voltage signal iac. The computer 31 compares the digital signal values $I_1$ and $I_2$, and on the basis of the comparison result, produces a comparison signal, and causes the up/down counter unit incorporated (although not shown) within the computer 31 to count up or to count down. The function of the up/down counter unit is the same as that of the up/down counter 20 shown in FIG. 2. The computer 31 outputs a 4-bit output of the up/down counter unit as a third digital signal $S_{d3}$ so as to supply the time constant selecting circuit 21. The time constant selecting circuit 21 decodes the third digital signal $S_{d3}$ consisting of 4 bits into a 16-bit signal, and outputs it as the selecting signals $S_0$ through $S_{15}$. The operations thereafter are the same as that in the case of the control apparatus of the welder 50 shown in FIG. 2, namely, the control is made so that the time constant Ts of the load simulation circuit 16 becomes equal to the time constant T of the DC side. It is obvious for those skilled in the art that the computer 31 can be readily realized on the basis of the aforementioned description, by employing a microcomputer or the like, so that the detailed explanation of a flowchart or the like is omitted.

Figure 8:
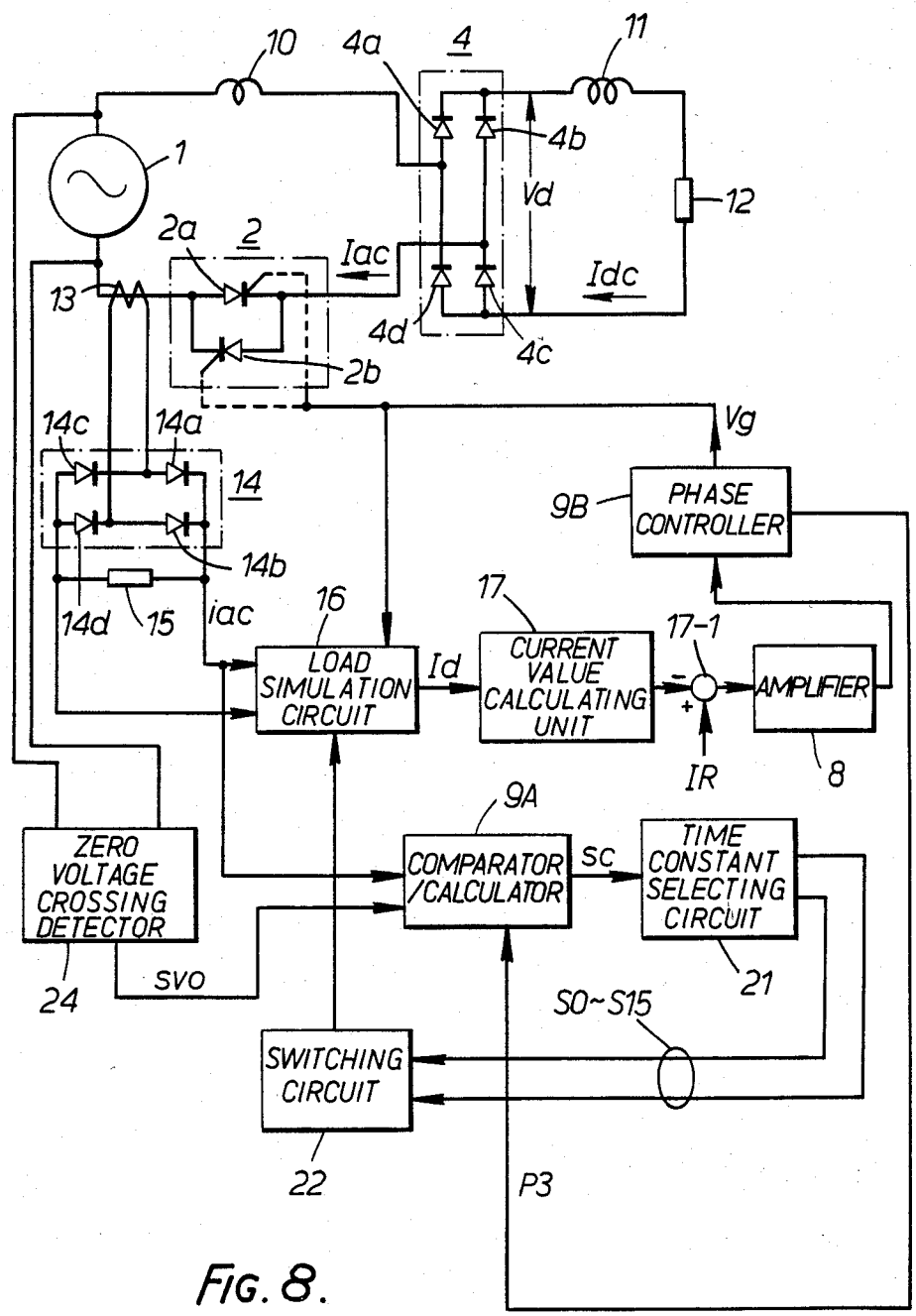
FIG. 8 is a diagram illustrating a circuitry of a DC-type welder of still another embodiment according to the present invention.

Furthermore, still another embodiment of the present invention will be described with reference to FIG. 8. FIG. 8 shows one embodiment of a DC-type welder 70 with a control apparatus, a part of which is realized by utilizing a computer, according to the present invention. In FIG. 8, the control apparatus of the welder 70 is provided with a comparator/calculator 19A in place of the comparator/calculator 19 and the up/down counter 20 in the control apparatus of the welder 50 shown in FIG. 2. Further, the timer circuit 18 thereof is not utilized, and the phase controller 9A is substituted by a phase controller 9B. The phase controller 9B outputs, as is the same as the phase controller 9A, the firing pulse Vg to control conduction phase of the current regulator 2 so that the DC current $I_{dc}$ which flows through the electrodes 5 equals the current reference $I_R$. Further, the phase controller 9B outputs pulse $P_3$ instead of the pulse P at the time $t_5$ which lags slightly behind the time $t_4$ at which the firing pulse Vg rises. The DC-type welder 70 is provided with a zero voltage crossing detector 24 which detects the voltage of the AC power source 1, and at the instant at which thus detected voltage becomes zero level, produces a zero voltage crossing signal $S_{v0}$. The comparator/calculator 19A is connected to receive the voltage signal iac developed across the resistor 15, the output pulse $P_3$ from the phase controller 9B and the zero voltage crossing signal $S_{v0}$ outputted from the zero voltage crossing detector 24.

Figure 9:
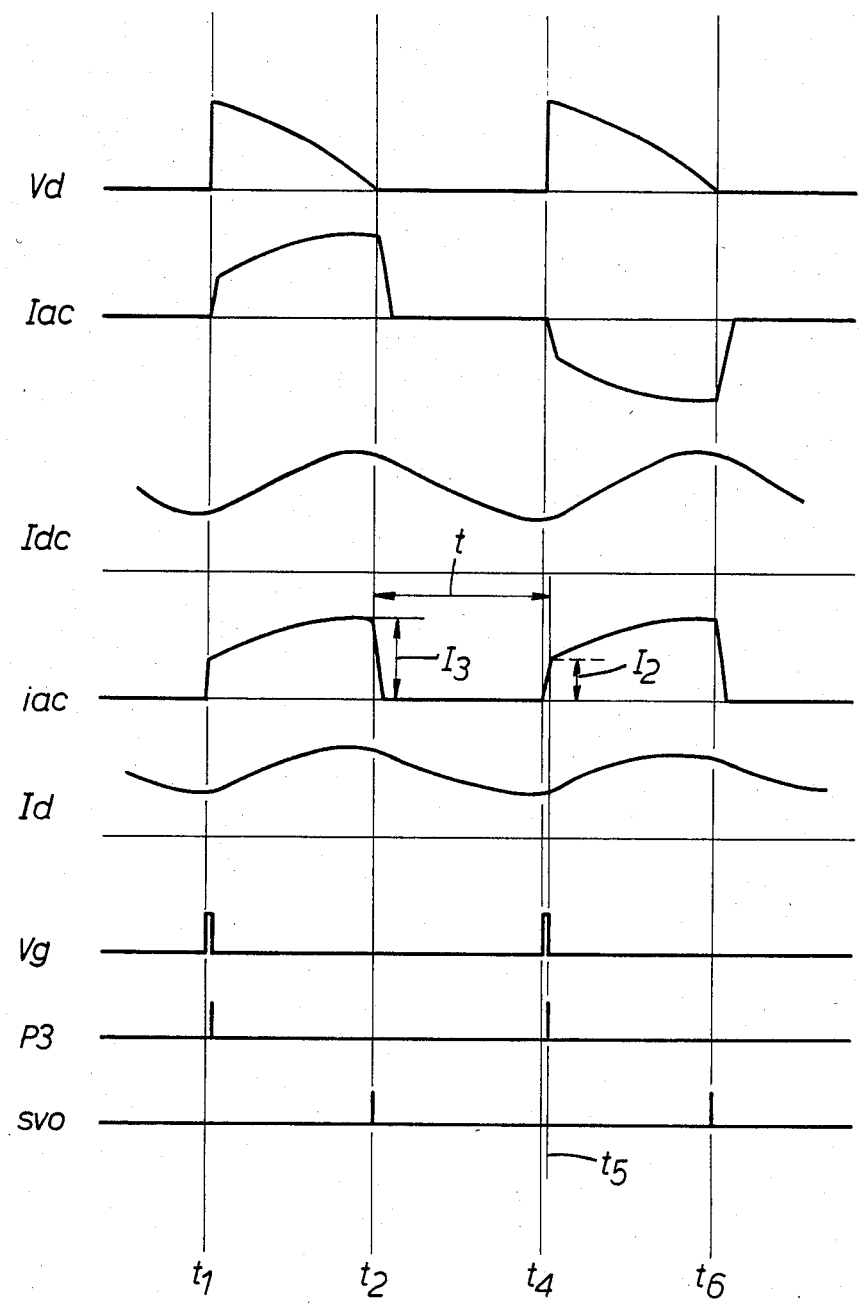
FIG. 9 is a diagram illustrating waveforms of principal portion of the DC-type welder shown in FIG. 8.

FIG. 9 shows waveforms of principal portion of the DC-type welder 70. As shown in FIG. 9, the zero voltage crossing signal $S_{v0}$ is outputted at the times $t_2$, $t_6$ . . . . . The comparator/calculator 19A detects at the time $t_2$ at which the zero voltage crossing signal $S_{v0}$ is received, the value $I_3$ of the voltage signal iac which lies at the instant immediately before the thyristor $2a$ or $2b$ is turned on. Moreover, the comparator/calculator 19A detects the value $I_2$ of the voltage signal iac at the time $t_5$ at which the pulse $P_3$ is received, that is, at which the thyristor $2a$ or $2b$ is turned on and thereby the AC current $I_{ac}$ rises. Further, a time interval, $t = t_5 - t_2$ is obtained from the times $t_2$ and $t_5$.

Here, during the period between the times $t_2$ and $t_5$, the DC current $I_{dc}$ of the welder 70 attenuates in accordance with the time constant $T = L/R$. The output signal Id of the load simulation circuit 16 attenuates in accordance with the time constant Ts during the period between the times $t_2$ and $t_5$. To achieve the simulation of the DC current $I_{dc}$ by using the signal Id, the time constant Ts should be caused to equal the time constant T. In this case, the values of the signal Id at the times $t_2$ and $t_5$ become the signal values $I_3$ and $I_2$, and the following equation can be held;

$$I_2 = I_3 \times \exp\left(-\frac{t}{T}\right) \quad (1)$$

from the equation (1) the time constant T can be obtained by the following equation.

$$T = \frac{t}{\ln I_3 - \ln I_2} \quad (2)$$

As described above, the time constant T can be obtained from the signal values $I_2$ and $I_3$, and the time interval t.

The comparator/calculator 19A generally employs a microcomputer to perform the operation of the equation (2). The signal values $I_2$ and $I_3$ are quantized in value of approximately 0 through 255, and the values of $l_n I_2$ and $l_n I_3$ are preliminarily calculated and stored within a main memory (not shown) of the microcomputer. Measurement of the time interval t can be readily made by utilizing a gate and a counter to count sufficient number of clock pulses for calculation of time during the period the gate is open, the gate being opened at the time $t_2$ and closed at the time $t_5$. Therefore, when the comparator/calculator 19A receives the signal values $I_2$ and $I_3$, and the time interval t, the solution of the equation (2) can be readily obtained by utilizing essential functions of microcomputer such as subtraction and division To cause the time constant Ts to equal the thus obtained time constant T, the time constant T is quantized in value of, for instance, 0 through 15. And at every respective time constant T, the switching conditions of the switches 52-0 through 52-15, that is which of them will be switched on and which of them will be switched on, are preliminarily determined by calculation and stored within the main memory. When the time constant T is obtained in the above-described manner, on the basis of thus obtained time constant T, a control signal Sc to perform an on-off control of the switches 52-0 through 52-15 is outputted. The time constant selecting circuit 21 outputs, on the basis of such control signal Sc, 16-bit selecting signals $S_0$ through $S_{15}$ so as to supply the switching circuit 22. The switching circuit 22 receives the selecting signals $S_0$ through $S_{15}$, and causes the switches 52-0 through 52-15 to be turned on or off so that the time constant Ts of the load simulation circuit 16 becomes equal to the time constant T obtained by the equation (2) in the above-described manner. It is obvious for those skilled in the art that the aforementioned functions can be readily realized by utilizing a microcomputer, so that further detailed description is omitted.

In the above described embodiment, the voltage signal iac is used for determining the simulated time constant Ts. But the simulated signal Id may be used instead of the voltage signal iac for the purpose of determining the simulated time constant Ts, because the values of the voltage signal iac at the times $t_2$ and $t_5$ are equal to those of the simulated signal Id at the times $t_2$ and $t_5$, respectively.

As described above, also in this embodiment, there is provided a minor loop such that the time constant Ts of the load simulation circuit 16 is invariably caused to coincide with the time constant of the DC side of the welder 70. This can simulate the DC current $I_{dc}$ without measurement of DC current $I_{dc}$ but only with simple detection of AC current $I_{ac}$.

Although the present invention has been described in the embodiment applied for the DC-type welder, the present invention is not limited to the specific embodiments thereof, it may be broadly applied for DC power source apparatus and control apparatus thereof to supply a DC load a controlled DC current obtained from an AC power source through a current regulator that consists of electronic contactors and a rectifier circuit.

Though this invention has been described about specific embodiments for a single phase main circuit, it is believed obvious that modification and variation of this invention are possible for the main circuit provided with a polyphase half-wave rectifier circuit or a polyphase full-wave rectifier circuit.

Furthermore, the welders shown in FIGS. 7 and 8 have only a part thereof processed by means of the incorporated computer, however, additional other parts thereof can also be realized by utilizing a computer.

Despite that one example of the load simulation circuit has been described with reference to FIG. 4, this invention is not limited to this, but includes such circuits that produce the waveform which corresponds to the current of an AC side during the period the electronic contactors are in the ON state, and attenuates in accordance with a time constant which simulates the time constant of a DC side during the period the electronic contactors are in the OFF state.

As described above, according to the present invention, the value of larger DC main-circuit current can be obtained indirectly, that is, not by direct detection thereof but by detecting smaller current in the primary AC side of a transformer with such a simple current detector as a current transformer, and by virtue of the load simulation circuit. This can achieve current detection not at a load side but at a control apparatus side, thus causes the welder to become extremely simple and economical in wiring installation. Moreover, this can shorten the wiring distance between the current detector on AC side of the DC power source apparatus and the control apparatus, so that the effect of noise disturbance or the like can be minimized, whereby highly accurate control can be performed. Furthermore, in the case of a robot welder, the DC side main circuit has a larger number of movable portions, so that possible wire-disconnections can extremely deteriorate its reliability, however, according to the present invention, higher reliability can be achieved due to capability of current detection on the stationary side.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A DC power source apparatus, comprising:
   current regulator means including electronic contactor means;
   transformer means including a primary winding and a secondary winding, said primary winding being connected in series with said current regulator means to form a series circuit, said series circuit being adapted to receive power from an AC power source;
   rectifier means connected to said secondary winding of said transformer means, output terminals of said rectifier means being adapted to supply DC current to a DC load including inductance;
   simulation means including means connected to detect an AC current flowing through said series circuit for simulating said DC current flowing through said DC load based on said detected AC current and a simulated time constant of said DC load to produce a simulated signal; and
   control means connected to receive said simulated signal for comparing said simulated signal with a predetermined current reference to produce a phase control signal based on a comparison result;
   said current regulator means further including means connected to receive said phase control signal for controlling said electronic contactor means such that said DC current becomes equal to a predetermined value corresponding to said predetermined current reference and;

means connected to receive said detected AC current for rectifying said detected AC current to produce a rectified signal, and load simulation means connected to receive said rectified signal for simulating said DC current based on said rectified signal and said simulated time constant to produce said simulated signal, said simulated signal being determined such that during a first period when at least one of said electronic contactor means is in the ON state said simulated signal is determined based on a waveform of said rectified signal, and during a second period when all of said electronic contactor means are in the OFF state said simulated signal is determined to have such a waveform that said rectified signal, at a time immediately before said electronic contactor means is turned off, attenuates in accordance with said simulated time constant.

2. The DC power source apparatus according to claim 1, further comprising:

means connected to receive said rectified signal and said simulated signal for determining said simulated time constant such that a value of said simulated signal at a time ($t_3$) immediately before at least one of said electronic contactor means is turned on becomes equal to a value of said rectified signal at a time ($t_5$) immediately after at least one of said electronic contactor means is turned on, said simulated time constant being applied to said simulation means.

3. The DC power source apparatus according to claim 1, further comprising:

means connected to receive said simulated signal for determining said simulated time constant such that a value of said simulated signal at a time ($t_3$) immediately before at least one of said electronic contactor means is turned on becomes equal to a value of said simulated signal at a time ($t_5$) immediately after at least one of said electronic contactor means is turned on, said simulated time constant being applied to said simulation means.

4. The DC power source apparatus according to claim 1, further comprising:

means connected to detect an AC voltage across said AC power source for producing a zero voltage crossing signal when said detected AC voltage crosses the zero voltage level; and means connected to receive said zero voltage crossing signal and said rectified signal for determining said simulated time constant based on a time interval between a first time ($t_2$) when said zero voltage crossing signal is produced and a second time ($t_5$) immediately after at least one of said electronic contactor means is turned on, a value of said rectified signal at said first time ($t_2$) and a value of said rectified signal at said second time ($t_5$), said simulated time constant being applied to said simulation means.

5. The DC power source apparatus according to claim 1, further comprising:

means connected to detect an AC voltage across said AC power source for producing a zero voltage crossing signal when said detected AC voltage crosses the zero voltage level; and means connected to receive said zero voltage crossing signal and said simulated signal for determining said simulated time constant based on a time interval between a first time ($t_2$) when said zero voltage crossing signal is produced and a second time ($t_5$) immediately after at least one of said electronic contactor means is turned on, a value of said simulated signal at said first time ($t_2$) and a value of said simulated signal at said second time ($t_5$), said simulated time constant being applied to said simulation means.

6. The DC power source apparatus according to claim 1, wherein said control means includes:

current value calculating means connected to receive said simulated signal for converting said simulated signal into an effective value thereof or a mean value thereof;

comparison means connected to receive an output signal of said current value calculating means for comparing said output signal with said predetermined current reference to produce a difference signal based on a comparison result; and phase control circuit means connected to receive said difference signal for producing said phase control signal.

7. The apparatus according to claim 1, wherein said load simulation means includes:

a rectifier element connected to receive said rectified signal;

delay circuit means connected to receive an output signal of said rectifier element, a time constant of said delay circuit means being determined to be equal to said simulated time constant; and switch means connected to receive said phase control signal for resetting said delay circuit means according to said phase control signal.

8. The apparatus according to claim 7, wherein:

said rectifier element includes a diode;

said delay circuit means includes a capacitor and variable resistor means, the value of said variable resistor means being determined such that said time constant of said delay circuit means is equal to said simulated time constant; and said switch means includes a series connected circuit of a switch and a resistor, said switch being controlled by said phase control signal.

9. The apparatus according to claim 8, wherein:

said variable resistor means includes a plurality of series connected resistors, each of said plurality of series connected resistors being adapted to connect a switch in parallel, each said switch being controlled such that said time constant of said delay circuit means is equal to said simulated time constant.

10. The apparatus according to claim 1, wherein said control means includes:

current value calculating means connected to receive said simulated signal for converting said simulated signal into an effective value thereof or a mean value thereof;

comparison means connected to receive an output signal of said current value calculating means for comparing said output signal with said predetermined current reference to produce a difference signal based on a comparison result; and phase control circuit means connected to receive said difference signal for producing said phase control signal.

11. The apparatus according to claim 10, further comprising:

time constant determining means connected to receive said rectified signal and said simulated signal for determining said simulated time constant such that a first value of said simulated signal at a first time ($t_3$) immediately before at least one of said electronic contactor means is turned on becomes equal to a second value of said rectified signal at a second time ($t_5$) immediately after at least one of said electronic contactor means is turned on, said simulated time constant being applied to said load simulation means.

12. The apparatus according to claim 11, wherein said time constant determining means includes:

timer circuit means for producing a first pulse ($P_2$) at said first time ($t_3$) and a second pulse ($P_3$) at said second time ($t_5$) according to said phase control pulse of said phase control circuit means;

comparator/calculator means connected to receive said rectified signal, said simulated signal, said first pulse ($P_2$) and said second pulse ($P_3$) for comparing said first value ($I_1$) of said simulated signal at said first time ($t_3$) when said first pulse ($P_2$) is received with said second value ($I_2$) of said rectified signal at said second time ($t_5$) when said second pulse ($P_3$) is received to produce a comparison signal based on a comparison result;

up/down counter means connected to receive said comparison signal for counting up or down based on said comparison signal;

time constant selecting circuit means connected to the output of said up/down counter means for decoding said output to produce a selecting signal corresponding to said simulated time constant; and switching circuit means connected to receive said selecting signal and connected to said load simulation means for controlling such that said time constant of said load simulation means becomes equal to said simulated time constant based on said selecting signal.

13. The control apparatus according to claim 10, further comprising:

time constant determining means connected to receive said simulated signal for determining said simulated time constant such that a first value of said simulated signal at a first time ($t_3$) immediately before at least one of said electronic contactor means is turned on becomes equal to a second value of said simulated signal at a second time ($t_5$) immediately after at least one of said electronic contactor means is turned on, said simulated time constant being applied to said load simulation means.

14. The control apparatus according to claim 13, wherein said time constant determining means includes:

timer circuit means for producing a first pulse ($P_2$) at said first time ($t_3$) and a second pulse ($P_3$) at said second time ($t_5$) according to said phase control pulse of said phase control circuit means;

micro-computer means connected to receive said simulated signal, said first pulse ($P_2$) and said second pulse ($P_3$) for comparing said first value ($I_1$) of said simulated signal at said first time ($t_3$) when said first pulse ($P_2$) is received with said second value ($I_2$) of said simulated signal at said second time ($t_5$) when said second pulse ($P_3$) is received to produce a comparison signal on a comparison result, and for counting up or down based on said comparison signal;

time constant selecting circuit means connected to the output of said micro-computer means for decoding said output to produce a selecting signal corresponding to said simulated time constant; and switching circuit means connected to receive said selecting signal and connected to said load simulation means for controlling such that said time constant of said load simulation means becomes equal to said simulated time constant based on said selecting signal.

15. The control apparatus according to claim 10, further comprising:

zero voltage crossing detector means connected to detect an AC voltage across said AC power source for producing a zero voltage crossing signal when said detected AC voltage crosses the zero voltage level; and time constant determining means connected to receive said zero voltage crossing signal and said rectified signal for determining said simulated time constant based on a time interval between a first time ($t_2$) when said zero voltage crossing signal is produced and a second time ($t_5$) immediately after at least one of said electronic contactor means is turned on, a first value ($I_3$) of said rectified signal at said first time ($t_2$) and a second value ($I_2$) of said rectified signal at said second time ($t_5$), said simulated time constant being applied to said load simulation means.

16. The control apparatus according to claim 15, wherein:

said phase control circuit means further includes means for producing a pulse ($P_3$) at said second time ($t_5$) based on said phase control signal; and wherein, said time constant determining means includes micro-computer means connected to receive said zero voltage crossing signal, said rectified signal and said pulse ($P_3$) for determining said time interval between said first time ($t_2$) when said zero voltage crossing signal is received and said second time ($t_5$) when said pulse ($P_3$) is received, for detecting said first value ($I_3$) of said rectified signal at said first time ($t_2$) when said zero voltage crossing signal is received and said second value ($I_2$) of said rectified signal at said second time ($t_5$) when said pulse ($P_3$) is received and for determining said simulated time constant based on said time interval, said first value ($I_3$) and said second value ($I_2$) to produce a selection signal corresponding to said simulated time constant; and switching circuit means connected to receive said selecting signal and connected to said load simulation means for controlling such that said time constant of said load simulation means becomes equal to said simulated time constant based on said selecting signal.

17. The control apparatus according to claim 10, further comprising:

zero voltage crossing detector means connected to detect an AC voltage across said AC power source for producing a zero voltage crossing signal when said detected AC voltage crosses the zero voltage level; and time constant determining means connected to receive said zero voltage crossing signal and said simulated signal for determining said simulated time constant based on a time interval between a first time ($t_2$) when said zero voltage crossing signal is produced and a second time ($t_5$) immediately after at least one of said electronic contactor means is turned on, a first value ($I_3$) of said simulated signal at said first time ($t_2$) and a second value ($I_2$) of said simulated signal at said second time ($t_5$), said simulated time constant being applied to said load simulation means.

18. A DC-type welder, comprising:

a current regulator including a thyristor;

a transformer including a primary winding and a secondary winding, said primary winding being connected in series with said current regulator to form a series circuit, said series circuit being adapted to receive power from an AC power source;

a first rectifier connected to said secondary winding of said transformer, output terminals of said first rectifier being adapted to supply DC current to a welding load including inductance;

a current detector connected to detect an AC current flowing through said series circuit;

a second rectifier connected to receive said detected AC current for rectifying said detected AC current to produce a rectified signal;

a load simulation circuit connected to receive said rectified signal for simulating said DC current flowing through said welding load based on said rectified signal and a simulated time constant to produce a simulated signal, said simulated signal being determined such that during a first period when said thyristor is in the ON state and simulated signal is determined based on a waveform of said rectified signal, and during a second period when said thyristor is in the OFF state said simulated signal is determined to have such a waveform that said rectified signal at a time immediately before said thyristor is turned off attenuates in accordance with said simulated time constant;

a current value calculating unit connected to receive said simulated signal for converting said simulated signal into an effective value thereof or a means value thereof;

a comparator connected to receive an output signal of said current value calculating unit for comparing said output signal with a predetermined current reference to produce a difference signal based on a comparison result; and a phase controller connected to receive said difference signal for producing a phase control signal;

said current regulator further being connected to receive said phase control signal for controlling said thyristor such that said DC current becomes equal to a predetermined value corresponding to said predetermined current reference.

* * * * *